G. F. SMITH.
SYSTEM OF CONTROL.
APPLICATION FILED SEPT. 1, 1917.

1,327,784.

Patented Jan. 13, 1920.

WITNESSES:

INVENTOR
Gerald F. Smith
BY
ATTORNEY

UNITED STATES PATENT OFFICE.

GERALD F. SMITH, OF BRADDOCK TOWNSHIP, ALLEGHENY COUNTY, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,327,784.   Specification of Letters Patent.   Patented Jan. 13, 1920.

Application filed September 1, 1917. Serial No. 189,340.

*To all whom it may concern:*

Be it known that I, GERALD F. SMITH, a citizen of the United States, and a resident of Braddock township, in the county of Allegheny and State of Pennsylvania, have invented a new and useful Improvement in Systems of Control, of which the following is a specification.

My invention relates to systems of control for dynamo-electric machines and especially to the regenerative control thereof under relatively high-voltage conditions.

One object of my invention is to provide a relatively simple and inexpensive control system for effecting reliable and satisfactory regenerative operation of a plurality of dynamo-electric machines that are connected to a relatively high-voltage supply circuit.

More specifically stated, it is an object of my invention to utilize one of the propelling motors upon a vehicle that is adapted for high-voltage operation, for the purpose of exciting the field windings of the other main machines during the regenerative period, the exciting machine being partially energized in accordance with the value of some auxiliary mechanical load upon the vehicle, such as ventilating blowers, air-compressors, or the like.

Figure 1:
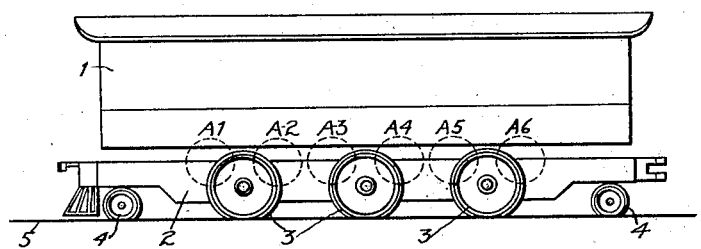
Figure 2:
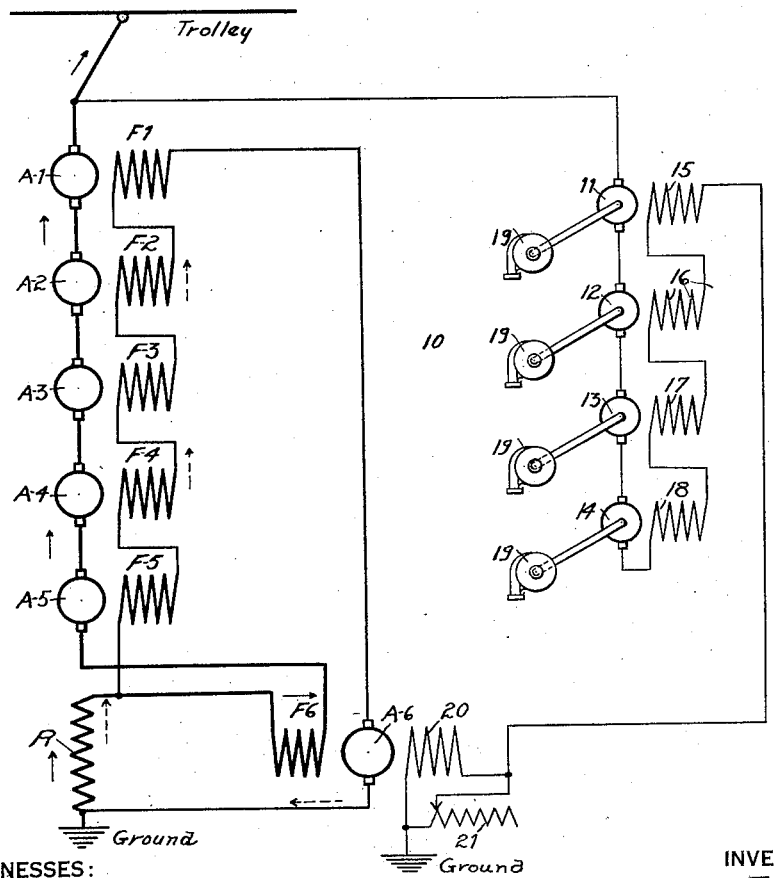

In the accompanying drawing illustrating my present invention, Figure 1 is a simplified view of a locomotive half-unit to which the invention may be applied; and Fig. 2 is a diagrammatic view of the essential circuits that are employed in carrying out my invention.

Referring to Fig. 1 of the drawing, the structure shown comprises a locomotive cab or vehicle body 1 that is suitably mounted upon one or more supporting trucks 2, which are provided with driving-wheels 3 and bogie or guiding wheels 4 that travel along track rails 5. A plurality of propelling dynamo-electric machines, having armatures A1 to A6, inclusive, are shown as associated in pairs with the respective driving-wheel axles, any suitable type of transmission mechanism being employed, which it is not deemed necessary to illustrate here.

To successfully operate direct-current locomotives from a relatively high-voltage circuit, such as five thousand volts, it is necessary to employ a number of armatures in series relation, in order to reduce the voltage per commutator and thus decrease the liability to "flash-over" difficulties. Furthermore, if it is desired to utilize regenerative braking in such a locomotive, it is very desirable to eliminate all high-voltage circuits from the auxiliary excitation system, particularly since only a relatively low operating voltage is required to properly excite the main field windings. For this reason, a special motor-generator set, driven from the supply circuit, is objectionable and, in addition, is expensive in construction and costly in operation.

According to my present invention, therefore, I employ one of the main machines, preferably the machine that is located nearest the ground or negative side of the supply circuit, for exciting the field windings of the other main machines which are utilized to regeneratively return energy to the supply circuit. As a further improvement, I also energize the exciting armature in accordance with the value of an auxiliary mechanical load in the locomotive, such as the ventilating blowers for the main machines.

The system shown in Fig. 2 comprises supply-circuit conductors "Trolley" and "Ground", of relatively high direct-current voltage; the main dynamo-electric machines of the locomotive respectively having commutator-type armatures A1 to A6, inclusive, and field windings F1 to F6, inclusive, of the series type; a stabilizing resistor R that is associated with the several main machines in a manner to be set forth; and an electrically-driven auxiliary mechanical load 10 which influences the regenerative operation, as hereinafter more fully explained.

The main armatures A1 to A5, inclusive, are connected to return energy to the supply circuit, while the remaining armature A6, which is located nearest the ground conductor, is utilized for exciting the field windings of all the regenerating machines, as subsequently traced in detail.

The auxiliary mechanical load system 10 may be installed upon the locomotive in any well-known manner and comprises a plurality of auxiliary dynamo-electric machines respectively having commutator-type armatures 11, 12, 13 and 14 and series-related field windings 15, 16, 17 and 18, the respective machines being shown as adapted to drive ventilating blowers 19 for the familiar purpose of cooling the main machines during the operation thereof. A field winding 20 for the exciting armature A6 is connected in series relation with the several field windings and armatures of the auxiliary machines across the supply circuit. A variable resistor 21 is connected in parallel relation to the field winding 20 for the purpose of regulating the effective excitation thereof, and the series-type field winding F6 is connected differentially with respect to the field winding 20, for a purpose to be set forth.

Inasmuch as the particular system of acceleration that is employed is immaterial to my present invention, with the exception that the exciting armature A6 is embodied in one of the main or propelling motors, I have not deemed it necessary to illustrate or describe any such system of acceleration.

Assuming, therefore, that regenerative operation has been begun in any suitable manner and that the various circuits are initially as illustrated in Fig. 2, the operation of the regenerative system may be set forth as follows: the main or regenerative circuit (indicated by the solid arrows) is established from ground, which is of slightly higher potential than the trolley under regenerative conditions, through the stabilizing resistor R, the differential field winding F6 and the main armatures A5 to A1, inclusive, in series relation, to the supply-circuit conductor Trolley.

The main-field-winding or exciting circuit (indicated by the dotted arrows) is established from the positive terminal of the armature A6 through the stabilizing resistor R and the main field windings F5 to F1, in series relation, to the negative terminal of the armature A6.

An auxiliary circuit is connected between the supply-circuit conductors Trolley and Ground and comprises the several armatures and field windings 11 to 18, inclusive, of the auxiliary machine or machines and the field winding 20 for the exciting armature A6, the field winding being shunted by the variable resistor 21.

Initially, a small portion of the resistor 21 is connected across the field winding 20, whereby the exciting effect thereof is a minimum and the total effective energization of the exciting armature A6 is relatively low, in order to provide the proper exciting current to the main field windings F1 to F5, under high-speed conditions of the machine. As the vehicle speed during the retardation period gradually decreases, the resistor 21 may be correspondingly increased, either manually or automatically, to thereby increase the effective exciting flux for the armature A6 and compensate for such speed decrease. However, any other suitable regulating action for achieving the desired result may be utilized, if desired.

It will be appreciated that my present invention is not limited, in its application, to the particular regenerative system shown which, moreover, is not of my present invention, but is fully set forth and claimed in a copending application of Rudolf E. Hellmund, Serial No. 44,443, filed August 9, 1915, patented Apr. 1, 1919, No. 1,298,706, and assigned to the Westinghouse Electric & Manufacturing Company.

The system shown, however, is desirable because of its inherent stabilizing characteristics, which may briefly be set forth as follows: as indicated by the solid and dotted arrows, respectively, the regenerated current and the exciting current both traverse the stabilizing resistor R in the same direction. Consequently, an incipient increase of regenerated current immediately increases the voltage drop across the resistor R, whereby the voltage available for delivery from the exciting armature A6 to the main field windings F1 to F5 is correspondingly reduced to effect a decrease of the regenerated current to the desired normal value. The converse action takes place in the event of an incipient decrease of regenerated current.

The voltage delivered by the exciting armature A6, were it not for the differential relation of the field winding F6, would tend to decrease in accordance with the vehicle speed during the regenerative period, since the speed of the exciting armature is the same as that of the regenerative machines, while the excitation of the field winding 20 is substantially constant for a given setting of the shunting resistor 21.

To avoid this difficulty, and to utilize apparatus that is already installed upon the locomotive for other purposes, the illustrated connections of the two field windings F6 and 20 for the exciting armature A6 are provided. The substantially constant load that is furnished by the several ventilating blowers 19 produces a voltage-regulating effect upon the exciting armature A6 that is comparable to the steadying influence of a shunt field winding.

The joint regulating effect of the exciting field winding 20 and the differential field winding F6 upon the regenerated voltage may be explained as follows: if an incipient increase of regenerated current traverses the main armatures A1, etc., and the differential field winding F6, two actions, each tending to reduce the excitation of the main field winding F1, etc., take place in addition to the similar inherent effect of the stabilizing resistor R, as hereinbefore set forth. In the first place, the increased differential action of the field winding F6 causes the total effective field flux for the exciting armature A6 to correspondingly decrease, and secondly, the rotation of that armature, carrying a relatively heavy current, in a relatively weak field, particularly under high-speed conditions, causes a distorting action upon the field flux. This double or cumulative demagnetizing effect tends to substantially prevent current surges in the machines.

In these ways, a substantially constant value of current is returned to the supply circuit, irrespective of voltage fluctuations thereof, and by suitable manipulation of the auxiliary resistor 21, or any other desired form of regulation, the gradual decrease in vehicle speed during the retardation period may be compensated for, in accordance with familiar principles.

I do not wish to be restricted to the specific circuit arrangements or location of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit and a plurality of dynamo-electric machines severally having armatures and field windings, of a mechanical load, means for connecting one of said machines to excite the other field windings, and means responsive to the value of said mechanical load for coöperating to regulate the excitation of said exciting machine.

2. In a system of control, the combination with a supply circuit and a plurality of main dynamo-electric machines severally having armatures and field windings, of a mechanical load, an auxiliary machine for driving said load, means for connecting one of said main machines to excite the other main field windings, and means responsive to the current traversing said auxiliary machine for coöperating to regulate the excitation of said exciting machine.

3. In a system of control, the combination with a supply circuit and a plurality of dynamo-electric machines severally having armatures and field windings, of a mechanical load, means for connecting all but one of said machines to regenerate to said supply circuit, means for connecting the remaining machine to excite the field windings of the regenerative machines, and means responsive to the value of said mechanical load for coöperating to regulate the excitation of said exciting machine.

4. In a system of control, the combination with a supply circuit and a plurality of main dynamo-electric machines severally having armatures and field windings, of a mechanical load, an auxiliary machine for driving said load, means for connecting all but one of said main machines to regenerate to said supply circuit, means for connecting the other main machine to excite the field windings of the regenerative machines, and means responsive to the current traversing said auxiliary machine for coöperating to regulate the excitation of said exciting machine.

5. In a system of control, the combination with a supply circuit and a plurality of main dynamo-electric machines severally having armatures and field windings, of a mechanical load, an auxiliary machine connected to said supply circuit for driving said load, means for connecting all but one of said main machines to regenerate to said supply circuit, means for connecting the other main machine to excite the field windings of the regenerative machines, the field winding of said exciting machine being connected in series relation with the regenerating machines, and a field winding for said exciting machine connected in series relation with said auxiliary machine.

6. In a system of control, the combination with a supply circuit of relatively high voltage and a plurality of main dynamo-electric machines severally having armatures and field windings, of a mechanical load, a plurality of auxiliary machines connected to said supply circuit for conjointly driving said load, means for connecting all but one of said machines in series relation to regenerate to said supply circuit, means for connecting the other main machine to excite the field windings of the regenerative machines, and a field winding for said exciting machine connected in series relation with said auxiliary machines.

7. A system of control comprising a supply circuit, a plurality of main dynamo-electric machines severally having armatures and field windings, a mechanical-load-driving machine, a translating device connected in series relation with all but one of said main machines across the supply circuit, means for connecting the other main machine to excite the field windings of all the main machines but itself, and a field winding for said exciting machine connected in series relation with said auxiliary machine.

8. A system of control comprising a supply circuit, a plurality of main dynamo-electric machines severally having armatures and field windings, a mechanical-load-driving machine, a resistor connected in series relation with all but one of said main machines and with a field winding of the other machine across the supply circuit, means for connecting the other main-machine to excite the field windings of all the main machines but itself through said resistor, and a field winding for said exciting machine connected in series relation with said auxiliary machine.

9. A system of control comprising a supply circuit of relatively high voltage, a plurality of main dynamo-electric machines severally having armatures and field windings, a plurality of mechanical-load-driving auxiliary machines fed from said supply circuit, a resistor connected in series relation with all but one of said main machines and with a differentially-related field winding of the other machine across the supply circuit, means for connecting the other main machine to excite all the main field windings but its own through said resistor, and a field winding for said exciting machine connected in series relation with said auxiliary machines.

In testimony whereof I have hereunto subscribed my name this 20th day of August, 1917.

GERALD F. SMITH.